United States Patent [19]
Woodward

[11] Patent Number: 5,484,538
[45] Date of Patent: Jan. 16, 1996

[54] MULTIPLE SERVICE WATER PURIFIER AND DISPENSER AND PROCESS OF PURIFYING WATER

[75] Inventor: Mark S. Woodward, Longview, Tex.

[73] Assignee: Texavia International, Inc., Longview, Tex.

[21] Appl. No.: 120,979

[22] Filed: Sep. 14, 1993

[51] Int. Cl.⁶ .................... B01D 37/00; B01D 63/00
[52] U.S. Cl. .................. 210/767; 210/257.1; 210/181; 210/134; 222/192
[58] Field of Search .................... 210/767, 650, 210/651, 257.1, 257.2, 195.1, 195.2, 181, 134, 464, 470; 222/146.1, 146.6, 189, 108, 109, 146.2, 132, 135, 192; 62/347

[56] References Cited

U.S. PATENT DOCUMENTS

| | | | |
|---|---|---|---|
| 3,856,676 | 12/1974 | Grimme, Jr. et al. | 210/257.2 |
| 4,207,994 | 6/1980 | Offlee, Sr. . | |
| 4,487,337 | 12/1984 | DeJardins | 222/132 |
| 4,623,467 | 11/1986 | Hamlin | 210/652 |
| 4,792,059 | 12/1988 | Kerner et al. | 222/189 |
| 4,801,375 | 1/1989 | Padilla | 210/257.2 |
| 4,852,621 | 8/1989 | Bear . | |
| 4,969,991 | 11/1990 | Valadez | 210/96.2 |
| 5,039,402 | 8/1991 | Himelstein | 210/257.1 |
| 5,042,689 | 8/1991 | Mrugala et al. . | |
| 5,064,097 | 11/1991 | Brog et al. | 210/262 |
| 5,108,590 | 4/1992 | DiSanto | 210/195.2 |
| 5,112,477 | 5/1992 | Hamlin | 210/85 |
| 5,135,645 | 8/1992 | Sklenack et al. | 210/446 |
| 5,193,720 | 3/1993 | Mayberry | 222/135 |

Primary Examiner—Ana M. Fortuna
Attorney, Agent, or Firm—Fish & Richardson

[57] ABSTRACT

The invention relates to a compact, portable multiple service apparatus and method for purifying and disinfecting water from potable or non-potable water sources and dispensing ice, room temperature water, cold water, and hot water made from the purified/disinfected water in this apparatus. This apparatus is equipped to receive input water from either a direct connection to a tap water system (in home or office), or other source of water (such as a well, stream or lake), or by a bottled reservoir containing water. The apparatus employs a particulate filter, an ultraviolet water germicidal treatment unit, and a carbon-type filter (or the like). A chiller unit is used for cooling the water and storing the cooled, purified water. A heater unit is used for heating the water. A freezer unit is employed for making ice cubes from the purified water. In a preferred embodiment of the invention, the air from the freezer unit is diverted to the chiller unit to chill the purified water. The apparatus of this invention is also equipped with a sensor to detect a failure of the ultraviolet water treatment unit so that in the event of a failure of the ultraviolet unit, the apparatus prevents additional introduction of input water into the system.

13 Claims, 6 Drawing Sheets

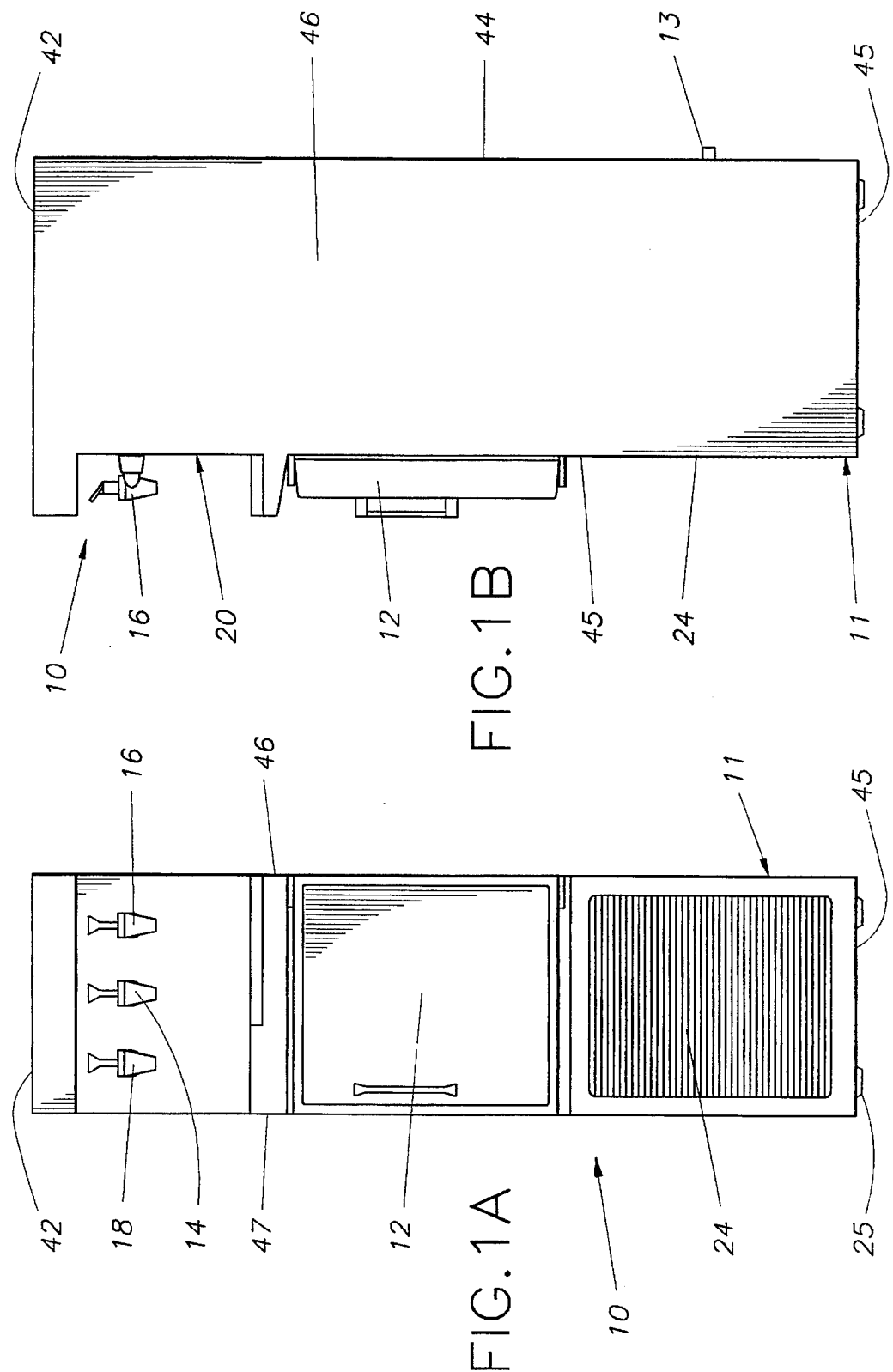

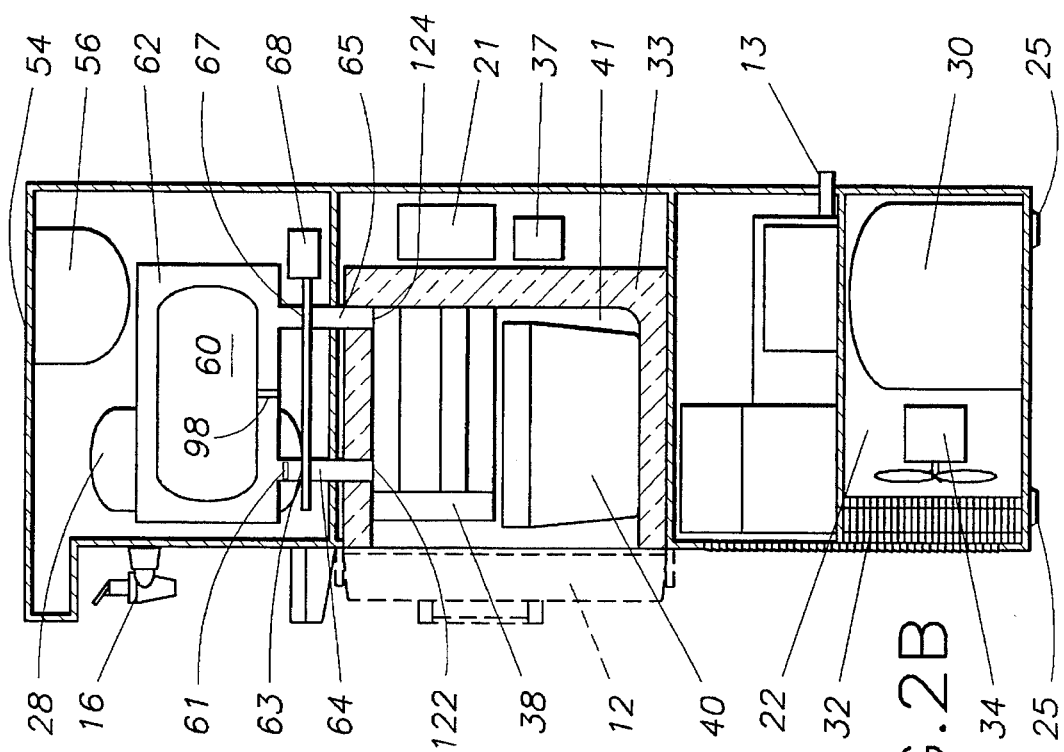
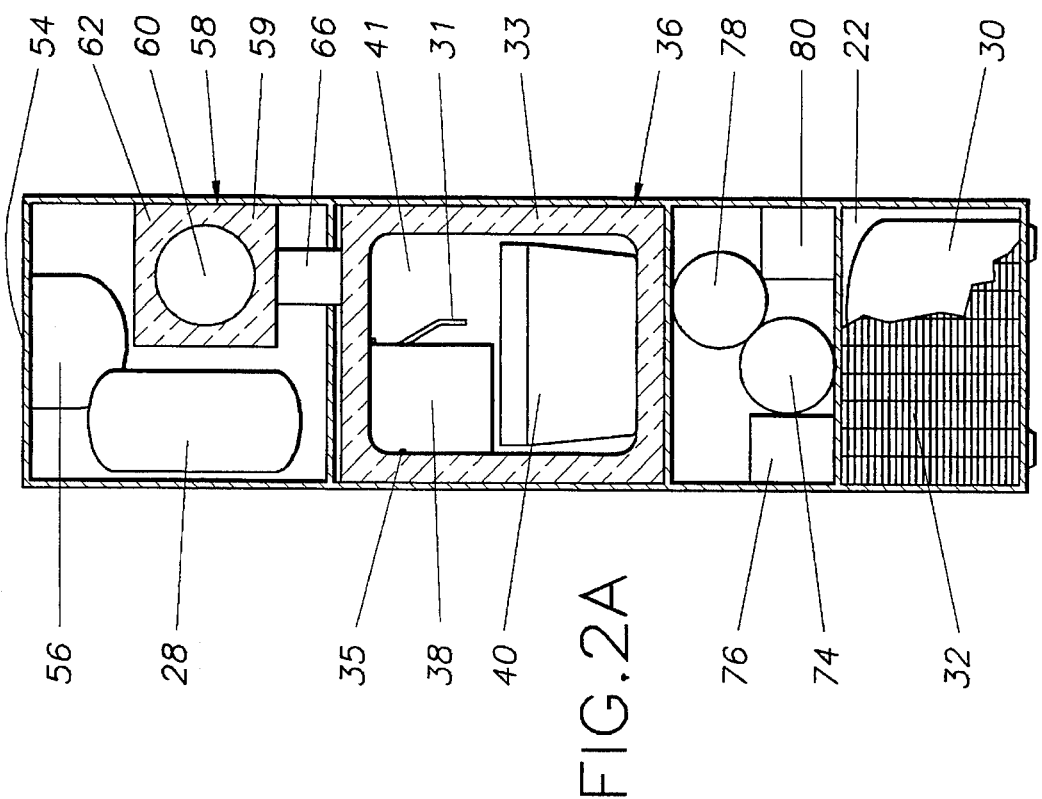

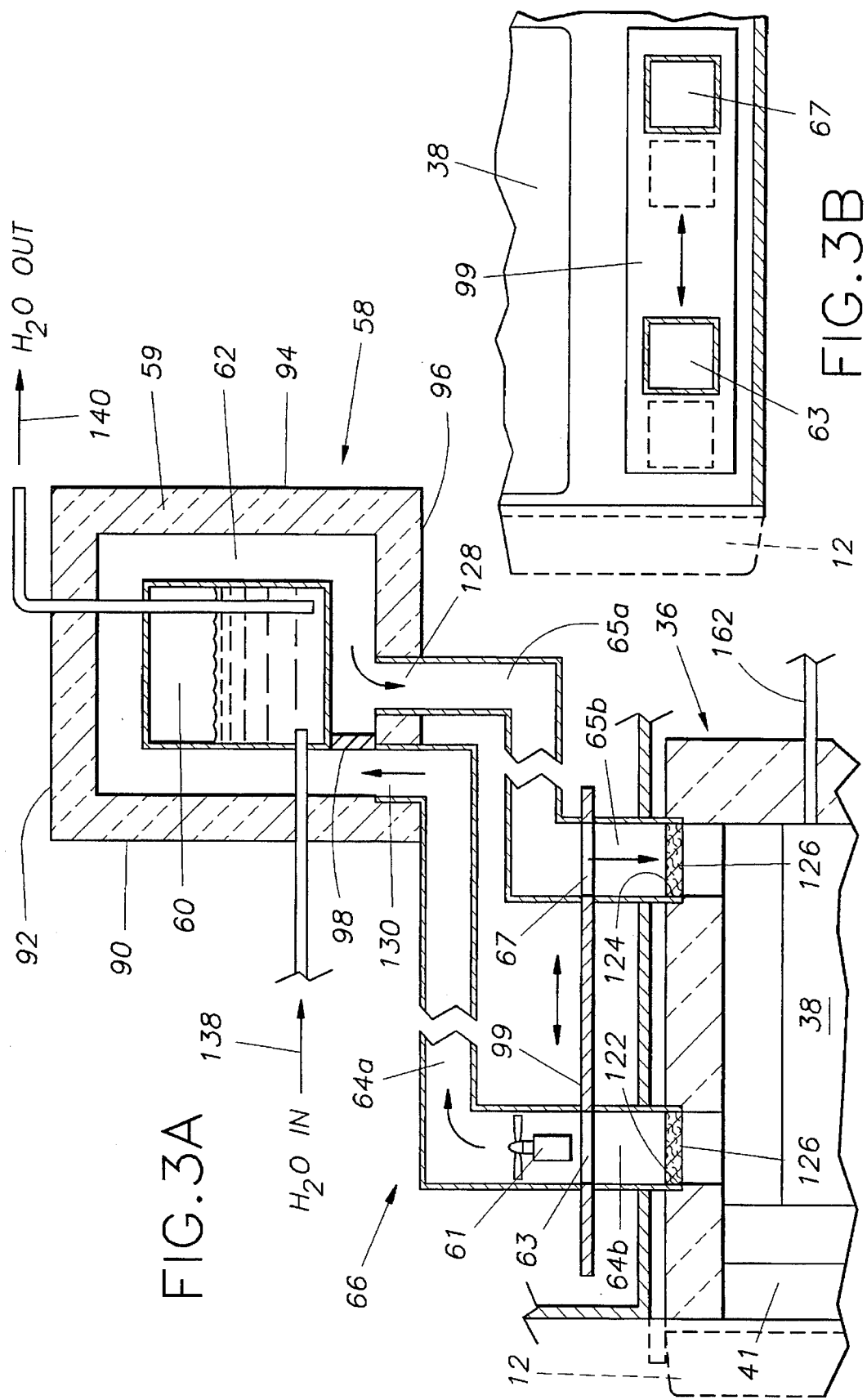

MULTIPLE SERVICE WATER PURIFIER AND DISPENSER AND PROCESS OF PURIFYING WATER

BACKGROUND AND SUMMARY OF THE INVENTION

The invention relates to a compact, portable multiple service apparatus for purifying and disinfecting water from potable or non-potable water sources and dispensing ice, room temperature water, cold water, and hot water made from the purified/disinfected water in this apparatus. This apparatus is equipped to receive input water from either a direct connection to a tap water system (in home or office), or other source of water (such as a well, stream or lake), or by a bottled reservoir containing water. The apparatus contains a switch-operated valve in the input line enabling the user to select the source of input water. A water pump moves the input water through a safety check valve, a particulate filter to remove solids, an ultraviolet water germicidal treatment unit to disinfect the water, thereby removing bacteria, protozoa, fungi, algae, and the like, and one or more carbon-type, or reverse osmosis filters (or the like) to remove chlorine and other chemicals (organic and/or inorganic) from the input water. The purified/disinfected water is then directed to an outlet tap for dispensing tepid purified water to the end user.

Additionally, the purified water is directed to a chiller unit for cooling the water and storing the cooled water where it is then conveyed to an outlet tap for dispensing cold purified water to the end user. Furthermore, the purified water is directed to a heater unit for heating the water where it is then conveyed to an outlet tap for dispensing hot purified water to the end user. The purified water is also directed to a freezer unit for making ice cubes from the purified water whereafter the purified ice cubes are stored in the freezer unit until they are dispensed to the end user.

In a preferred embodiment, the air from the freezer unit is diverted to the chiller unit to chill the purified water. The apparatus of this invention is also equipped with a sensor to detect a failure of the ultraviolet water treatment unit so that in the event of a failure of the ultraviolet unit, the safety check valve will close, and the pump will be shut off, thereby preventing additional introduction of input water into the system. The apparatus can be adapted to operate on available sources of electricity, or by battery.

BRIEF DESCRIPTION OF THE DRAWINGS

FIG. 1A is a front view of an apparatus according to the present invention.

FIG. 1B is a side view of an apparatus according to the present invention.

FIG. 2A is an interior front plan view of an apparatus according to the present invention.

FIG. 2B is an interior side plan view of an apparatus according to the present invention.

FIG. 3A is an expanded side view of a freezer unit and water chiller unit according to the present invention.

FIG. 3B is a top view of a freezer unit of the present invention.

DETAILED DESCRIPTION OF PREFERRED EMBODIMENTS

Figure 3C:
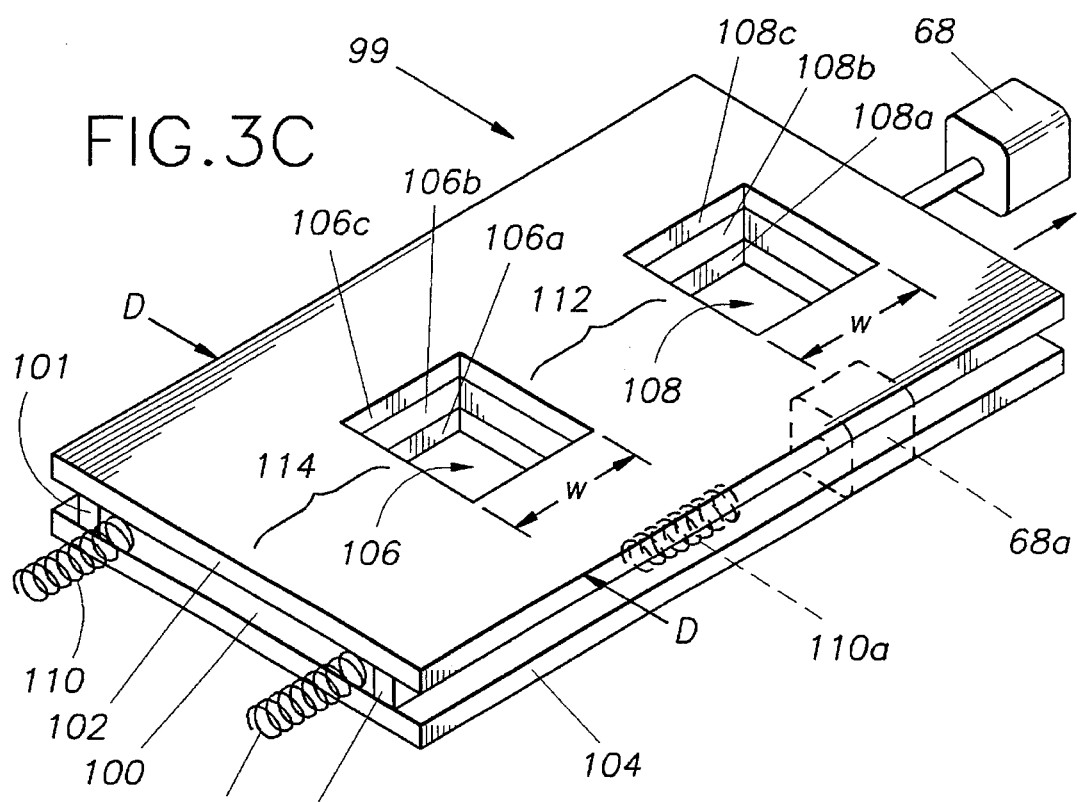
FIG. 3C is a partial plan view of a unitary sliding shunt mechanism according to the present invention.

Referring now to FIGS. 1A and 1B, there is shown a front view and side view of a multiple service water purifier and dispenser system 10 of the present invention. The system 10 contains a means for filtering solids out of the input water; a means for disinfecting the input water; a means for removing chemical contaminants; a means for dispensing tepid, purified/disinfected water; a means for heating purified/disinfected water and dispensing heated purified/disinfected water; a means for chilling purified/disinfected water and dispensing purified/disinfected water; and a means for making ice from purified/disinfected water and dispensing this purified/disinfected ice.

The system is preferably contained within a compact cabinet outer housing 11 having a top wall 42, bottom wall 43, back wall 44, front wall 45, right side wall 46, and left side wall 47. The cabinet housing sits on feet or wheels 25. In one preferred embodiment of the present invention, the cabinet housing 11 has an approximate height of 48 inches, an approximate width of 14 inches, and an approximate depth of 20½ inches. The housing can also contain hand holds (not shown) to facilitate movement or portability of the system.

Mounted to the exterior of the front wall 45 is a cold water tap 14, a hot water tap 16 and a tepid water tap 18. These taps are available in many varieties, such as the polypropylene, self-closing faucets offered from Ebtech (model no. POU1CTHS). These taps are preferably located within a recessed area 20 on the front wall 45. The lower portion of the front wall 45 is covered with a ventilation grille 24, which when removed, provides access to the condenser and compressor unit (not shown), the pressurization pump (not shown) and the filtration/disinfectant units (not shown). The system is equipped with a freezer unit which can be accessed through the freezer door 12. The system is adapted with a means to receive input water from a bottle (not shown, such as the conventional 5 gallon glass or plastic variety) and/or directly from another source, such as, a municipal water line, or other water source that may be tapped into, via connection to the input water inlet 13. Thus, where the system is used in home or office environments, it may be convenient and possible to connect the input water unlet 13 to the water delivery system present in the home or office. Where it is inconvenient, impractical or impossible to tie into an existing municipal water system, a bottle containing input water can be introduced into the system. Additionally, one end of a hose (not shown) could be placed in a water source, such as a lake or stream, and connected at the other end to inlet 13.

Referring now to FIGS. 2A and 2B, there is shown a front view and a side view of the interior of the cabinet housing 11. A self contained intake water reservoir 56 is provided to receive a bottle (not shown) full of intake water. In a preferred embodiment, the reservoir is constructed using a 3½ quart stainless steel reservoir manufactured by Marie Pot (Model No. 736314). The cabinet top wall is adapted with a port 54 which can be opened to receive the bottle, or closed when no bottle is employed. Typically the opening will be surrounded by a grommet for receiving the neck of the bottle. The system can also receive input water directly from another source, such as, a municipal water line, or other water source (such as a lake or stream) that may be tapped into by connecting such water source (via hose or other suitable means) to the input water inlet 13. The end user can select between either source of input water. The input water is fed (via tubing not shown) into a water pump 80 (such as a non-submersible, 134 gallon per minute pump sold by Eheim). The pump delivers the input water downstream (via tubing not shown) to the filtration/disinfection units and then delivers the filtered/disinfected water (via tubing not shown) to the tepid water tap, ice maker, water heater, and water chiller, and maintains pressure on the water line in the system. The water line is also preferably equipped with a pressure regulator 21 (such as offered by Furnace) that monitors the system water line pressure and automatically shuts off the pump when a pressure overload is detected or automatically turns on the pump when a pressure drop occurs, such as, when purified water is dispensed from one of the taps. Thus, as purified water is dispensed from the cold water, hot water, or tepid water taps, or when the ice maker inlet valve 37 opens, the system pressure will drop and the water pump will engage to replenish the purified water to that location within the system.

In a preferred embodiment, a means for filtering solids out of the input water is provided. The input water is first urged by the pump 80 (via tubing not shown) to the inlet of a replaceable solids prefilter 74 for removing particulates larger than 5 microns (such as the particulate filter cartridge, 5 micron, offered by Procam Controls, PCG05-98) wherein the input water is then urged through the prefilter. In a preferred embodiment, the flow rate capacity of the prefilter is 2 gallons per minute, a rate slightly less than the flow rate capacity of the pump. The system also preferably provides a means for disinfecting the input water. The thus prefiltered water is then preferably urged by the pump (via tubing not shown) from the exit outlet of the prefilter 74 to the inlet of a germicidal ultraviolet light water treatment unit 76 (such as the in-line variety offered by Aquafine Corp., SP-1) to disinfect the water prior to dispensing to the ice maker, water heater, water chiller, or tepid water tap. The prefiltered water then passes through the ultraviolet unit 76. Additionally, the system preferably provides a means for removing chemical contaminants from the input water. The input water, now preferably disinfected, is urged by the pump 80 (via tubing not shown) from the outlet end of the ultraviolet unit to the inlet end of one or more replaceable post-filters (or chemical removing cartridges 78 (for example, the activated carbon filter cartridge offered by Procam Controls, 155022-44, or reverse-osmosis cartridges, or the like) that are connected in series fashion to remove chemical contaminants, such as chlorine, lead and the like, from the water prior to dispensing the purified/disinfected water to the ice maker, water heater, water chiller, or tepid water tap. In a preferred embodiment, the flow rate capacity of the post-filters is 2 gallons per minute, a rate slightly less than the flow rate capacity of the pump.

The purified/disinfected water can then be directed by the pump 80 (via tubing not shown) from the outlet end of the last post-filter 78 to the tepid water tap 18 as a preferred means for dispensing tepid purified water, or to the inlet ends of the water heater unit 28, the water chiller unit 58, or the ice maker unit 38.

The system also contains within its housing a means for heating the purified water and dispensing the heated purified water. The system preferably uses a conventional electric water heater unit 28 (such as the 180 degree, set point, 500 watt variety offered by Ebtech), capable of receiving and heating the purified water and storing the hot purified water for dispensing through the hot water tap 16. The storage area of the water heater unit has an outlet port, preferably at its top, which is connected to the hot water tap 16 (via tubing not shown) such that when the tap is opened, the system line pressure will urge the hot water out of the storage area, through the tubing, and out the tap 16.

The system additionally provides a means for making ice from the purified water and storing and dispensing the purified ice. In a preferred embodiment, the system contains a thermostatically controlled, insulated freezer unit 36 which includes a conventional automatic ice maker unit 38 (such as the 23 lb capacity model no. 95 unit offered by U-line) for receiving purified water and making ice from the purified water. This ice maker dispensing unit normally includes an ice outlet, not illustrated, formed within a chamber 41 of the freezer unit. The ice is produced and automatically dispensed to a storage bin 40 contained in the freezer unit, and can be accessed through the freezer door 12. The walls of the freezer unit and freezer door are constructed out of suitable material, such as, brushed aluminum, and are insulted with a layer of suitable insulation material 33, such as, a poured polyurethane or styrofoam or the like. The condenser coils (not shown) are typically contained within the freezer walls in conventional fashion, such as, e.g., by press molding or die casting techniques or by embedding coils within the walls. A trip lever 31 is employed to detect the level of ice in the bin 40. The ice maker receives purified water from the system on an automatic basis by employing a solenoid-type fill valve or flow control demand valve 37. The refrigeration unit 22, normally comprised of a compressor 30, evaporator (not shown), fan unit 34 and condenser 32 (offered by Tecumseh/U-line), is connected in conventional fashion to cool the freezer unit chamber 41 to the desired thermostatically controlled temperature. The freezer unit chamber 41 contains a thermostat (not shown, such as the ice maker thermostat offered by U-Line, no. 4548) for regulation of the air temperature. The thermostat is electronically linked to the refrigeration unit 22.

The system also provides a means for chilling the purified water and dispensing the purified water. The water chiller unit 58 is capable of receiving and cooling the purified water and storing the cooled purified water for dispensing through the cold water tap 14. The water chiller unit 58 is comprised of a cold water storage reservoir 60 (such as a 2-quart, 304 stainless steel variety offered by Ebtech, or other suitable container) located within the chilled air cavity 62. The six outer walls 90, 92, 94, 96 (two not shown) of the chilled water cavity 62 preferably contain a layer of insulating material 59, such as a poured polyurethane, or styrofoam material, or the like. These outer walls can be adapted to contain condenser coils that are operatively liked with a refrigeration system (not shown) to chill the cavity 62.

In a preferred embodiment, the water chiller unit 58 is proximate to the freezer unit 36. The chiller unit 58 preferably operates interactively with the freezer unit 36 to share a single compressor/condenser mechanism or refrigeration system. In a preferred embodiment, to achieve this interactive sharing, the freezer unit 36 is modified to include a freezer outlet port 122 and a freezer inlet port 124 both extending through the wall of the freezer unit in suitable locations, preferably on the top wall at the end opposite the ice maker. These ports can be covered by a flow-through grille 126. As described in more detail below, the air in the freezer unit chamber space 41 is routed on demand to the thermostatically controlled chilled air cavity 62 of the water chiller unit 58 to provide for chilling of the purified water. Referring to FIGS. 3A, 3B and 4, there is shown a water chiller unit 58 having a front wall 90, side walls 91, 93, back wall 94, top wall 92 and bottom wall 96. These walls preferably are insulated with suitable insulation materials (not shown). A water input line 138 directs purified/disinfected water into the reservoir 60 for chilling. The water output line 140 directs chilled water from the reservoir 60 to the cold water tap 14 by virtue of the line pressure created by pump 80. The cold water reservoir 60 is mounted within the interior of the chiller unit 58 such that a chilled air cavity 62 is formed between the reservoir 60 and the inside of walls 90, 91, 92, 93, 94, and 96 by, for example, using mounting posts 136. The chiller unit 58 is provided with a chiller inlet port 130 (shown, for example, on the bottom wall 96) and a chiller outlet port 128 (also shown, for example, on bottom wall 96) extending through the chiller unit wall at suitable locations. In order to maximize chilling efficiency and to maintain even cooling temperatures around the reservoir 60, an air flow partition means 98 is provided to direct the air entering through port 130 around the reservoir 60 prior to the air exiting out port 128 to maximize the incoming air contact time with the reservoir 60. In this particular embodiment, the partition 98 resembles a "U-shape" having a bottom leg and two side legs. The bottom leg of the partition 98a is mounted to the bottom wall 96 and to the bottom edge of the reservoir 58. Partition side leg 98b is mounted to the side wall 93 and to an adjoining edge of the reservoir 58. Partition side leg 98c is mounted to the side wall 91 and to an adjoining edge of the reservoir 58. Without the partition, it is likely that some of the air entering through port 130 would proceed directly to the exit port 128 thereby creating uneven and less efficient chilling of the reservoir. The reservoir 60 is depicted as having a square shape. However, different reservoir configurations may be employed, different partition means can be configured, and alternate locations of the ports 130 and 128 can be utilized to cause circulation of air within the chiller air cavity 62.

Referring again to FIG. 3A, the water chiller and freezer unit contain an air bypass system 66 placed between the water chiller unit 62 and the freezer unit 36 to provide a means for selectively porting and circulating cold air between the freezer unit chamber 41 and the water chiller air cavity 62. The air bypass unit is provided with inlet ducts or first conduits 64a, 64b and return ducts or second conduits 65a, 65b that link, in fluid communication, the freezer unit chamber 41 with the water chiller air cavity 62. These ducts can be constructed out of suitable materials, such as plastic, and are preferably wrapped or coated with a suitable insulation material (not shown) such as styrofoam or poured polyurethane. The inlet duct 64b is attached at a first end to the freezer unit 36 sufficient to surround and encase the freezer outlet port 122. The inlet duct 64a is attached at a second end opposite the first end to the inlet side of a gate valve 63. The outlet side of the gate valve 63 is attached to a first end of the inlet duct 64a. The second end of the inlet duct 64b is attached to the chiller unit 58 sufficient to surround and encase the chiller inlet port 130 thereby creating a first conduit from the freezer chamber 41 to the chiller air cavity 62. Similarly, the return duct 65b is attached at a first end to the freezer unit 36 sufficient to surround and encase the freezer inlet port 124. The return duct 65a is attached at a second end opposite the first end to the inlet side of a gate valve 67. The outlet side of the gate valve 67 is attached to a first end of the return duct 65a. The second end of the return duct 65b is attached to the chiller unit 58 sufficient to surround and encase the chiller outlet port 128 thereby creating a second conduit from the chiller air cavity 62 to the freezer chamber 41.

The inlet duct or first conduit 64 and the return duct or second conduit 65 are equipped with gate valves 63 and 67, respectively, that operate at the direction of a means for positioning same in response to a signal. A preferred means to position the gate valves is a air bypass solenoid or actuator 68. The actuator 68 is electrically connected to a water chiller thermostat (not shown) and is energized or de-energized to provide the simultaneous opening or closing of the gate valves 63 and 67 to establish cooperative circulating flow of air to and from the freezer compartment on demand by the water chiller thermostat control unit. In a preferred embodiment, when the temperature of the chilled air cavity 62 exceeds the desired thermostatically set level, the thermostatic control unit in the cavity 62 signals the gate valves 63, 67 to open and also signals an in-line blower motor 61, preferably located in the first conduit, to activate to urge cold air in the freezer chamber 41 to move through the freezer outlet opening 122, into the first conduit inlet duct 64a, through the gate valve 63, through the in-line blower 61, through the first conduit inlet duct 64b, through the chiller inlet opening 130, around the cold water reservoir 60, out the chiller outlet opening 128, through the second conduit return duct 65b, through gate valve 67, through the second conduit return duct 65b, through the freezer inlet opening 124 and back into the freezer chamber 41 thereby achieving circulation of air between the freezer compartment and the chilled air cavity until the temperature of the chilled air cavity reaches the desired temperature. When the desired temperature is reached in the chilled air cavity 62, the thermostatic control unit in the cavity signals the gate valves to close. By so linking the freezer unit to the chiller unit, only one compressor/condenser unit or refrigeration system is necessary.

Figure 3D:
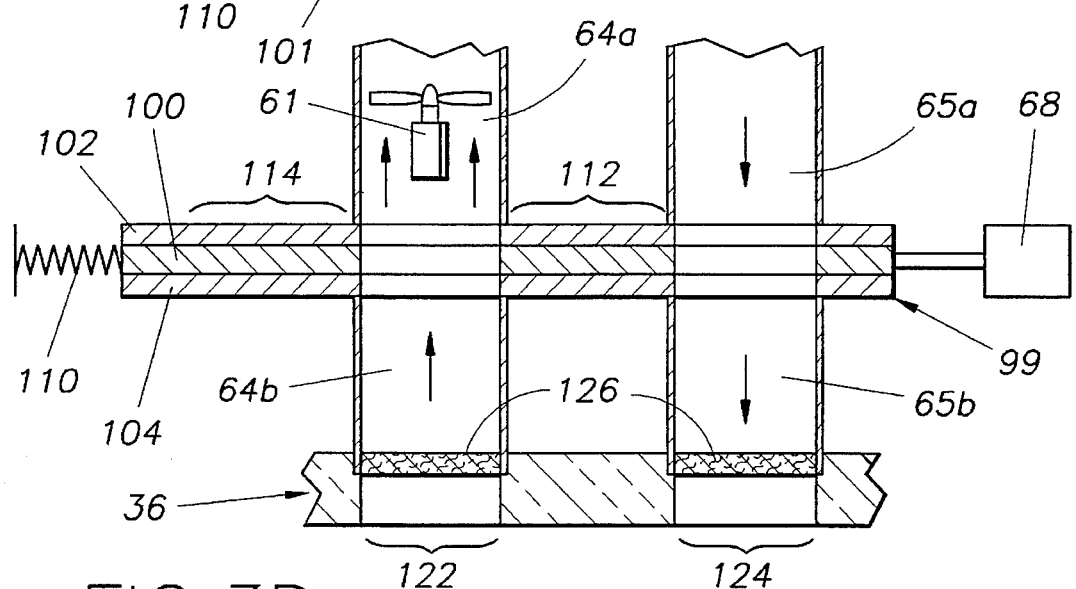
FIG. 3D is a cross-sectional view of FIG. 3C along line D—D.
Figure 4:
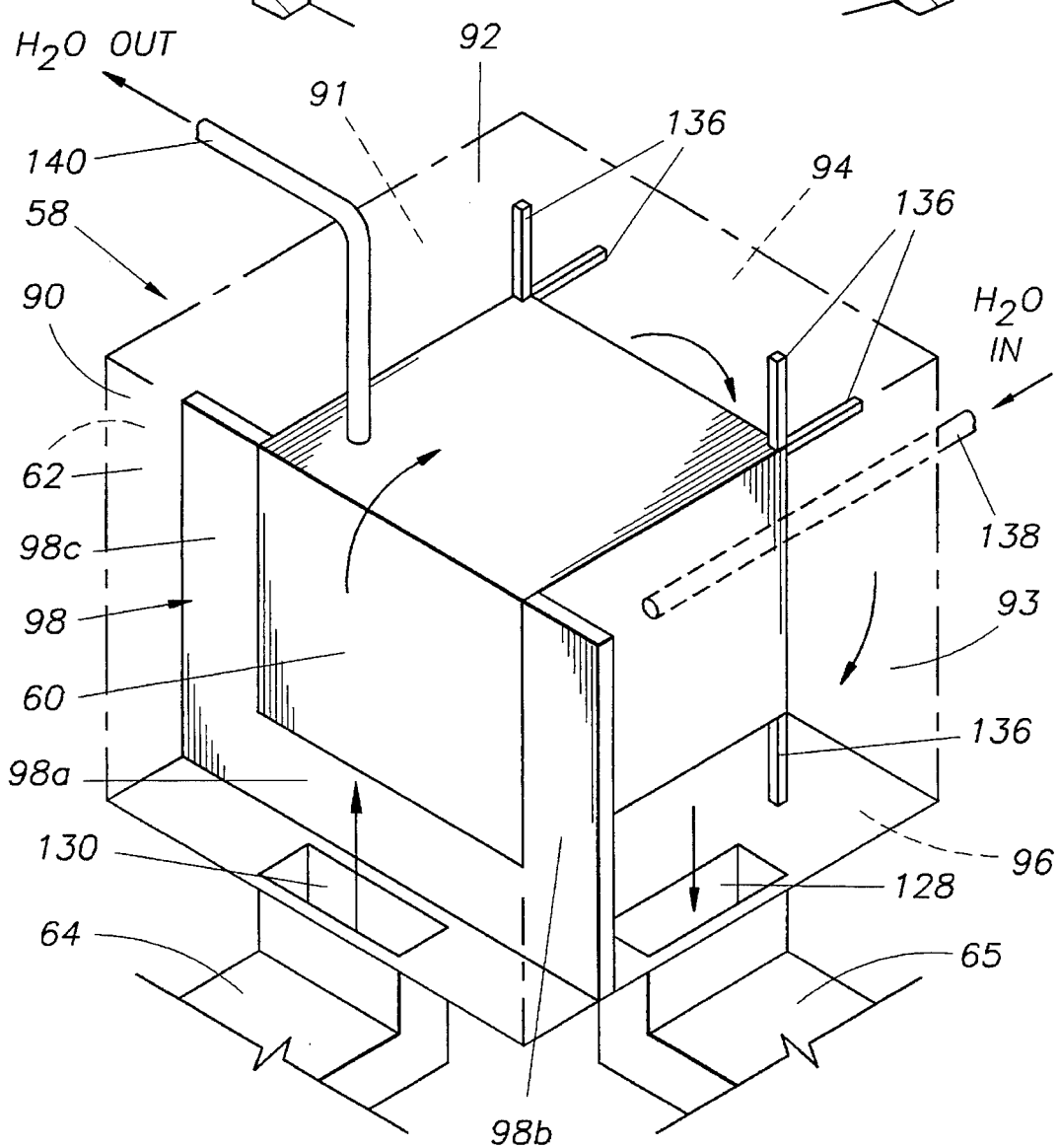
FIG. 4 is a plan view of a water chiller unit according to the present invention.

Referring also to FIGS. 3B, 3C and 3D, in a preferred embodiment, the gate valves 63 and 67 open and close by virtue of a unitary sliding shunt mechanism 99. The shunt mechanism preferably comprises a slidable shunt plate or blade 100 sandwiched between an upper plate 102 and a lower plate 104. The shunt mechanism also includes a means for laterally displacing the shunt blade in response to a signal from the thermostatic control unit in the chiller cavity 62. When the chiller cavity thermostat detects an increase in cavity temperature over the desired temperature, the thermostat sends a signal to actuate the shunt mechanism from its closed position to its open position. When the desired chiller temperature is reached, another signal is sent to actuate the shunt mechanism from its open position to its closed position. The lateral movement of the shunt blade 100 is preferably guided by the shunt blade guides 101, and is achieved by the spring action of a solenoid-type arm and spring actuator 68, or other lateral actuator means.

The actuator 68 may be a bidirectional pull-push/push-pull or cam variety fixably attached proximate one end of the shunt blade 100 and capable of moving and maintaining the shunt blade in a first position, then upon receipt of an electronic signal, moving (by pulling or pushing) the blade laterally from the first position to a second position, maintaining the blade in the second position, and returning (by pushing or pulling) the blade back to the first position upon receipt of another electronic signal. Additionally, the actuator 68 may be a unidirectional variety capable of moving (or pulling) the shunt blade 100 laterally from a first position to a second position, maintaining the blade in the second position, and then disengaging the pulling force to allow the blade to be returned to the first position by the operation of one or more springs 110 mounted to the shunt blade proximate the end opposite the actuator and mounted to a suitable fixed location on the freezer unit housing (or other suitable location). Where springs are used to pull the blade to its first position, the blade's return lateral movement is stopped either by the actuator or by some suitable stop (not shown) to ensure that the blade does not go beyond its first position.

Figure 3E:
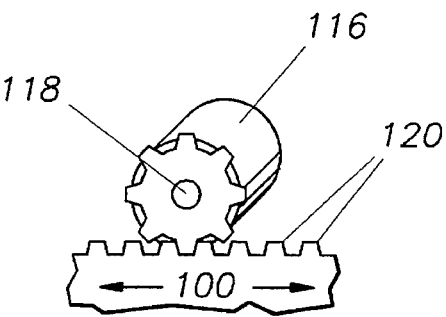
FIG. 3E is a partial exploded view of a shunt blade according to the present invention.

In an alternative preferred embodiment, a portion of blade guide 101 could be removed to enable the actuator 68a and any associated springs 110a to be mounted to the edge of the shunt blade 100. Lateral movement of the shunt blade could also be accomplished in other suitable ways, such as illustrated in FIG. 3E, by utilizing a reversible stepping motor 116 to rotate a gear 118 that in turn engages matching gear teeth 120 located on the edge of the shunt blade 100 thereby causing the desired lateral movement of the shunt blade.

The bottom plate 104, shunt blade 100, and top plate 102 each contain an inlet opening 106a, 106b, and 106c, respectively, and a return opening 108a, 108b, and 108c, respectively. The openings 106 and 108 are depicted in a rectangular shape, but other suitable shapes can be employed, such as, e.g., circular, oval, or square. Preferably, the inlet openings 106a, 106b and 106c are of substantially the same size. Preferably, the return openings 108a, 108b and 108c are of substantially the same size. Preferably the inlet openings 106 and return openings 108 are the same width (W). Furthermore, the openings 106a, 106b, 106c, 108a, 108b, and 108c are positioned on the blade and plates such that there is at least width W between the openings (as indicated by zone 112), and at least width W in zone 114. The upper plate 102, lower plate 104 and the shunt blade guides 101 are secured together in the cabinet outer housing proximate the freezer unit 36.

The shunt blade 100 in FIGS. 3C and 3D is shown in its open position thereby simultaneously creating an open passage way between inlet duct 64a and 64b within the first conduit, and between return duct 65a and 65b within the second conduit, which in conjunction with the operation of blower 61, creates circulation of air between the air in the freezer chamber 41 and the chilled air cavity 62. To discontinue the circulation, the shunt blade 100 is moved laterally from its open position to a closed position such that zone 114 of the shunt blade 100 creates a physical barrier between shunt inlet openings 106a and 106c thereby blocking the flow of air between the freezer chamber 41 and the chilled air cavity 62. Likewise, when the shunt blade 100 occupies this closed position, zone 112 of the shunt blade 100 creates a physical barrier between shunt return openings 108a and 108c thereby blocking the flow of air between the freezer chamber 41 and the chilled air cavity 62.

Figure 3F:
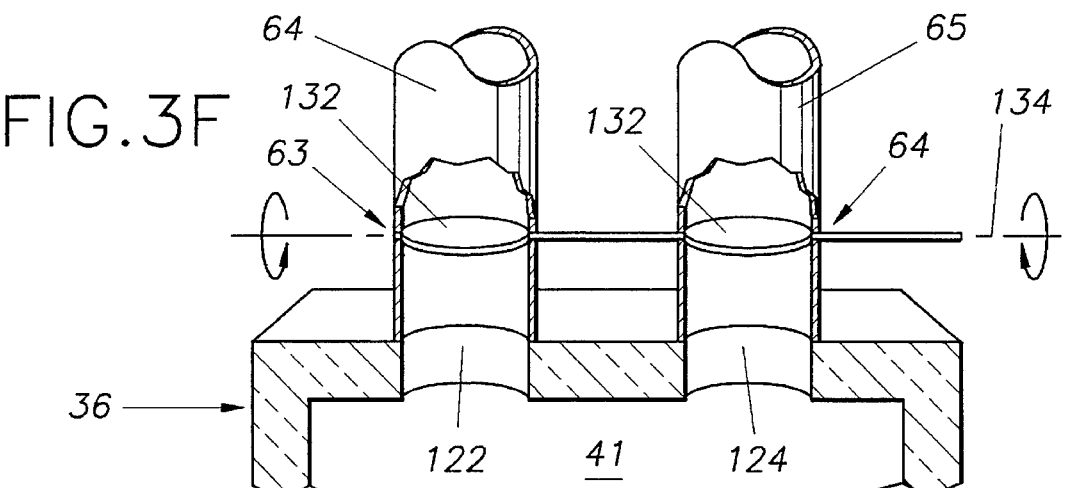
FIG. 3F is a partial plan view of a freezer unit according to the present invention.

Referring also to FIG. 3F, in an alternative preferred embodiment, the gate valves 63 and 67 open and close by virtue of damper baffles 132 that are attached within the ducts 64, 65 on a rotational axis 134. In this embodiment, the ducts 64, 65 are connected to the freezer ports 122, 124, and routed to the corresponding ports in the water chiller unit (not shown). When it is desired to prevent air flow through the ducts 64, 65, the baffles 132 are rotated to, and maintained in, a first position that is substantially perpendicular to ducts or conduits 64, 65. When it is desired to allow air flow through the ducts 64, 65, the baffles 132 are rotated to, and maintained in, a second position that is substantially parallel to ducts or conduits 64, 65. This rotational movement can be controlled by an actuator mechanism(s) (not shown) that is (are) connected to the rotational axis 134 and electronically linked to the thermostat control unit in the water chiller air cavity (not shown) or other like means.

In a preferred embodiment, the cold water storage area 60 has an outlet port proximate its top which is connected to the cold water tap 14 (via tubing 140) such that when the tap is opened, the system line pressure will urge the cold water out the bottom of the storage area, through the tubing, and out the tap.

Figure 5:
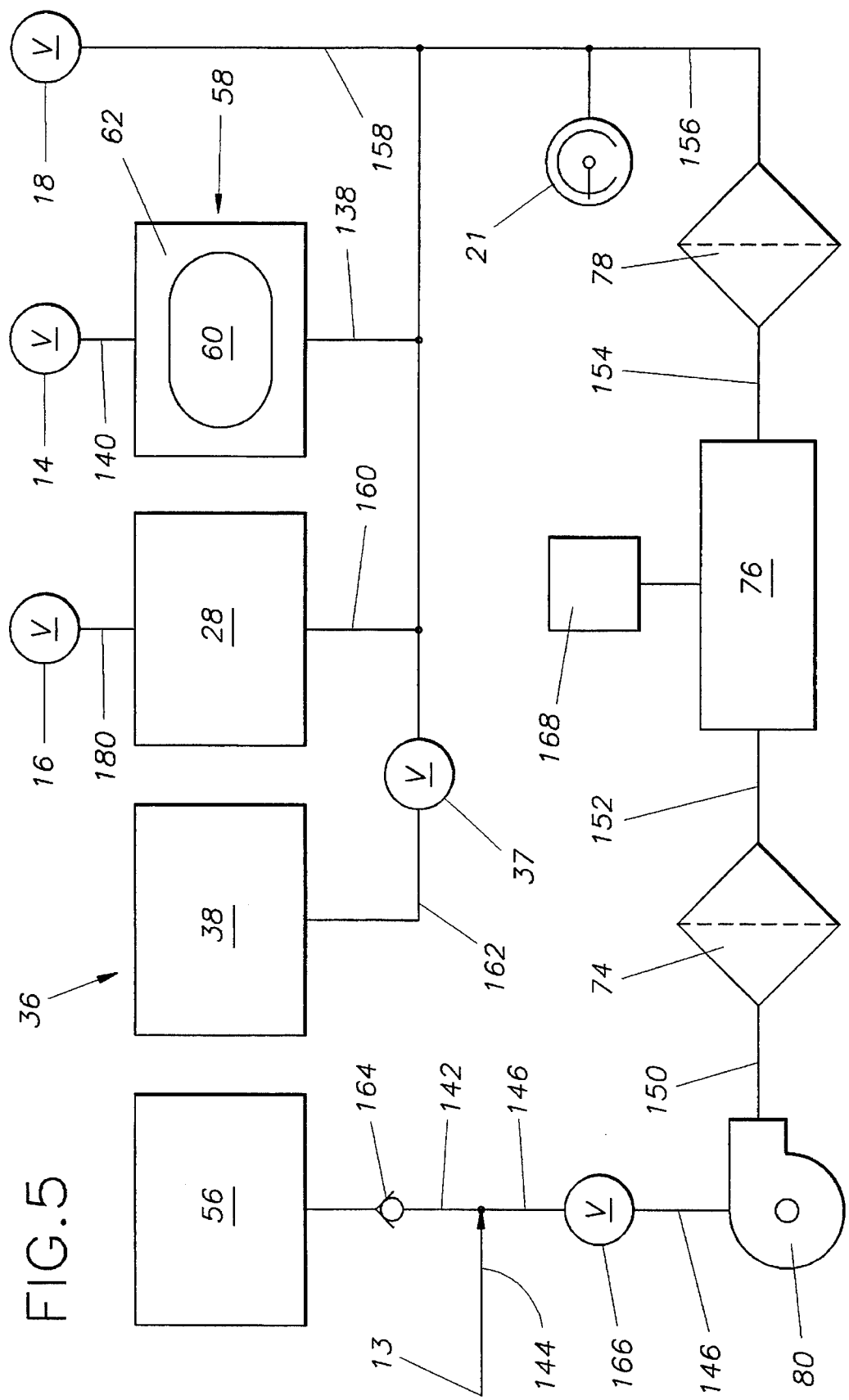
FIG. 5 is a schematic representation of the system of the present invention.

Referring now to FIG. 5, there is depicted a schematic representation of a preferred embodiment of the present invention. As previously described, the system can receive input water from either the intake water reservoir 56 (via, e.g., bottled water) or the input water inlet 13 (via, e.g., municipal tap water or hose). Tubing 142 taps into the intake reservoir 56 and directs water towards the pump 80. In a preferred embodiment, a check valve 164 is installed in tubing 142. Tubing 144 connects to the input water inlet 13 and directs water towards the pump 80. In a preferred embodiment, tubing 142 and 144 are joined together at a "Y" or "T" or other suitable connection to form tubing 146 which is then suitably connected to the inlet end of pump 80. The action of the pump 80 creates pressure within the system. In a preferred embodiment of this invention, a stop valve 166 (such as the system isolation solenoid valve offered by Grainger, No. 3A428) is installed in tubing 146 prior to the inlet end of the pump 80. The stop valve 166 is capable of receiving an electronic signal from a photo-electric sensor 168 that is used to monitor the operation of the ultraviolet unit 76. If the ultraviolet unit fails (i.e., the lamp is not on), the photo-electric sensor will detect the absence of the ultra-violet lamp light and send a signal to close the stop valve 166 and stop the pump 80, thereby preventing the system from dispensing water or ice that has not been disinfected. The pump 80 directs water through tubing 150 to the solids prefilter 74. The water passes through the prefilter 74 and then proceeds to the ultraviolet disinfection unit 76 via tubing 152. The water proceeds through the ultraviolet unit and then proceeds through tubing 154 to one or more post-filters 78. The thus filtered and decontaminated water is then routed through tubing 156 to the tepid water tap 18 (via connection with tubing 158), the cold water reservoir 60 of the water chiller unit 58 (via connection with tubing 138), the water heater unit 28 (via connection with tubing 160), or the ice maker 38 of the freezer unit 36 (via connection with the ice maker fill control valve 37 and tubing 162). The ice maker fill control valve 37 automatically opens to provide purified water to the ice maker on an as needed basis. The chilled purified water is routed from the cold water reservoir 60 to the tap 14 via tubing 140. The heated purified water is routed from the water heater 28 to the tap 16 via tubing 180. The system pressure control valve is preferably located in tubing 156 to monitor the line pressure. When a pressure drop is detected, such as would occur when any of the taps (14, 16, 18) or the ice machine fill valve 37 are opened, the pressure control valve 21 sends an electronic signal to the pump 80 to start pumping. When the taps or fill valve are closed, the system pressure will return, and a signal will be sent to the pump to stop pumping. The system can also be equipped with LED readout lights, or other signals, to indicate an ultraviolet light failure, or other system failure.

Referring again to FIGS. 2A and 2B, in an alternative preferred embodiment, the port 54 of the system 10 is provided with a removable air tight seal cover (not shown) containing a needle valve. When, for example, there is a mechanical failure of the pump 80, or no means to operate the pump 80, the air tight seal cover is removed, input water is placed in reservoir 56, the seal cover is placed back over the port 54, and a manual air pump (not shown) is attached to the needle valve to provide positive pressure to the water in the reservoir to facilitate movement of the water through the system. Referring again to FIGS. 3A and 3D, in another preferred embodiment of the present invention, the chiller unit 58 is mounted in the system housing directly beneath the freezer unit 36. In this embodiment, the freezer unit is preferably refrigerated by a gas driven refrigeration system requiring no electricity. The freezer ports 124 and 122 are located on the bottom wall of the freezer unit, and the chiller ports 128 and 130 are located on the top wall of the chiller unit in axial alignment with, and connected by conduits 64 and 65 to, the corresponding freezer ports 124 and 122, respectively. The two conduits 64 and 65 contain manually operable gate valves 63 and 76, respectively. When the chiller unit cavity 62 requires additional chilling, the gate valves are opened, and the denser, colder air from the freezer chamber 41 moves by convection down into the chiller cavity 62, while the lighter, warmer air in the chiller cavity 62, moves by convection up into the freezer unit chamber 41, thereby circulating the air without the need for an in-line fan blower. In another preferred embodiment, the system is provided with one or more batteries to supply electricity to the system. In another preferred embodiment, the system is equipped with an electrical generator (not shown) to supply the system with electrical power. In yet another preferred embodiment, the system is equipped with solar panels (not shown) to generate the power necessary to operate the system. In yet another embodiment, the in-line water disinfection chamber comprises a cell containing a source of radiation capable of disinfecting water passing through the cell, and further comprising a shield to prevent leakage of radiation from the cell (for example, a lead shield surrounding the cell. These embodiments have particular application when the system is going to be utilized in remote or undeveloped areas, or areas experiencing failure in the municipal electrical power systems, such as may be caused by a natural disaster.

In another preferred embodiment, there is provided a method for treating and purifying water and dispensing the purified water tepid, chilled, hot or ice form utilizing the apparatus of the instant invention comprising the steps of: providing a portable system in a housing containing a means for receiving input water, a means for filtering solids out of the input water, a means for disinfecting the input water, a means for removing chemical contaminants from the input water, a means for dispensing tepid purified water, a means for heating the purified water and dispensing the heated purified water, a means for chilling the purified water and dispensing the chilled purified water, a means for making ice from the purified water and storing and dispensing the purified ice, and a means for moving the water throughout the system under pressure; obtaining input water; filtering solids out of the input water; disinfecting the input water; removing chemical contaminants from the input water; dispensing tepid purified water; heating the purified water and dispensing the heated purified water; chilling the purified water and dispensing the chilled purified water; making ice from the purified water and storing and dispensing the purified ice; and moving the water throughout the system under pressure.

The receiving step of this method preferably comprises connecting a hose to a source of input water or a reservoir mounted in the housing capable of receiving water from a bottle. The solids filtration step preferably comprises moving the input water through an in-line, flow-through filtration cartridge capable of filtering out solid particulates greater than 5 microns in size from the input water as the input water is moved therethrough. The disinfecting step preferably comprises moving the input water through an in-line, flow-through ultraviolet light disinfection unit capable of disinfecting the input water as the input water is moved therethrough. The chemical contaminant removal step preferably comprises moving the input water through one or more in-line, flow-through filtration cartridges connected in series fashion capable of filtering out chemical contaminants from the input water as the input water is moved therethrough. The tepid water dispensing step preferably comprises moving the purified tepid water to a first tap mounted on the housing which receives the purified water at room temperature. The heating step and hot water dispensing step preferably comprise moving the purified water to a self contained, in-line electrical thermostatically controlled heating unit capable of receiving the purified water, heating the purified water to a desired temperature, and delivering the heated purified water to a second tap mounted on the housing. The chilling step and the chilled water dispensing step comprise moving the chilled purified water into a chiller unit having a first refrigeration system, a thermostatically controlled chilled cavity and a cold water reservoir housed within the chilled cavity for receiving and storing the purified water, chilling the purified water in the chiller unit and then delivering the chilled purified water to a third tap mounted on the housing. The ice making and ice dispensing step preferably comprises moving purified water to a freezer unit having a second refrigeration system, a thermostatically controlled freezer chamber, an automatic ice maker in the chamber capable of receiving the purified water, converting the purified water to ice, and finally dispensing the ice into an accessible storage bin located in the freezer. The water moving step preferably comprises connecting a pump at its inlet end to the input water reservoir or input water hose, and at its other end to conduit connecting, in series fashion, the filtration cartridges and the ultraviolet light unit, with the water heating unit, the ice maker, the tepid water tap and the cold water reservoir and then pumping the water throughout the system under a desired pressure.

In another preferred embodiment of the present invention, the method further includes the steps of operatively sharing a single refrigeration system between the chiller unit cavity and the freezer unit chamber; monitoring the pressure in the system with a pressure control regulator; activating the pump, by a signal from the pressure control regulator, when there exists a decrease in the desired system pressure; inactivating the pump, by a signal from the pressure control regulator, when there exists an increase in the desired system pressure; monitoring the ultraviolet unit with a photo-electric cell; and inactivating the pump, by a signal from the photoelectric cell, upon detection by the cell of a failure in the ultraviolet unit.

The sharing step in this embodiment preferably comprises the steps of creating a freezer outlet port on the freezer unit accessing the freezer chamber from outside the freezer unit; creating a freezer inlet port on the freezer unit accessing the freezer chamber from outside the freezer unit; providing a chiller inlet port on the chiller unit accessing the chiller cavity from outside the chiller unit; providing a chiller outlet port on the chiller unit accessing the chiller cavity from outside the freezer unit; linking in fluid communication the freezer chamber and the chiller cavity by connecting a first end of a first conduit to the freezer unit to encase the freezer outlet port, and connecting a second end of the first conduit to the chiller unit to encase the chiller inlet port; linking in fluid communication the freezer chamber and the chiller cavity by connecting a first end of a second conduit to the freezer unit to encase the freezer inlet port, and connecting a second end of the second conduit to-the chiller unit to encase the chiller outlet port; regulating fluid flow through the first conduit with a first gate valve located proximate the freezer outlet port, capable of maintaining an open position to allow fluid flow through the first conduit and capable of maintaining a closed position to prevent fluid flow through the first conduit; regulating fluid flow through the second conduit with a second gate valve located proximate the freezer inlet port, capable of maintaining an open position to allow fluid flow through the second conduit and capable of maintaining a closed position to prevent fluid flow through the second conduit; opening or closing the first and second gate valves in synchrony upon receipt of a signal from the chiller unit thermostatic control; circulating air from the freezer chamber to the chiller cavity and from the chiller cavity to the freezer chamber when the first and second gate valves are in their open positions; and partitioning the chiller cavity for routing the circulating air around the cold water reservoir. In this embodiment, the first and second gate valves and their opening and closing preferably comprise a unitary sliding shunt mechanism.

While there have been shown and described various embodiments of the invention, the invention is not limited thereto, but instead is defined by the scope of the following claims.

What is claimed is:

1. A multiple service water purifier and dispensing system for purified water comprising a housing containing:

means for receiving input water comprising a conduit connected to a source of input water or a reservoir mounted in the housing capable of receiving water from a bottle;

means for moving the water throughout the system under pressure comprising a pump connected to said conduit;

means for filtering solids from the water, disinfecting the water, and removing chemical contaminants from the water arranged in any order in series relationship and connected to said conduit;

said filtering means comprising an in-line, flow-through filtration cartridge capable of filtering out solid particulates greater than 5 microns in size from the water as the water is moved therethrough;

said disinfecting means comprising an in-line, flow-through ultraviolet light disinfection unit capable of disinfecting the water as the water is moved therethrough;

said chemical contaminant removing means comprising one or more in-line, flow-through chemical removal cartridges connected in series fashion capable of filtering out chemical contaminants from the input water as the input water is moved therethrough;

means for dispensing room temperature purified water connected to said conduit downstream of said serial arrangement of said filtering, disinfecting and chemical contaminant removing means comprising a first tap mounted on the housing which receives the purified water at room temperature;

means for heating the purified water and dispensing the heated purified water connected to said conduit downstream of said serial arrangement of said filtering, disinfecting and chemical removing means comprising a self contained, in-line thermostatically controlled heating unit capable of receiving the purified water, heating the purified water to a desired temperature, and delivering the heated purified water to a second tap mounted on the housing;

means for chilling the purified water and dispensing the chilled purified water connected to said conduit downstream of said serial arrangement of said filtering, disinfecting and chemical contaminant removing means comprising a chiller unit having a refrigeration system, a thermostatically controlled chilled cavity and a cold water reservoir housed within the chilled cavity for receiving and storing the purified water, the chiller unit being capable of delivering the chilled purified water to a third tap mounted on the housing; and means for making ice from the purified water and storing and dispensing the purified ice connected to said conduit downstream of said serial arrangement of said filtering, disinfecting and chemical contaminant removing means comprising a freezer unit having a refrigeration system, a thermostatically controlled freezer chamber, an automatic ice maker in the chamber capable of receiving the purified water, converting it to ice, and dispensing the ice into a storage bin located in the chamber, and a door mounted on the housing providing access to the chamber;

wherein the chiller and freezer units further include interactive means for operatively sharing a single refrigeration system comprising:

(a) a freezer outlet port on the freezer unit accessing the freezer chamber from outside the freezer unit;

(b) a freezer inlet port on the freezer unit accessing the freezer chamber from outside the freezer unit;

(c) a chiller inlet port on the chiller unit accessing the chiller cavity from outside the chiller unit;

(d) a chiller outlet port on the chiller unit accessing the chiller cavity from outside the freezer unit;

(e) a first conduit having a first end connected to the freezer unit to encase the freezer outlet port, and a second end connected to the chiller unit to encase the chiller inlet port thereby linking in fluid communication the freezer chamber and the chiller cavity;

(f) a second conduit having a first end connected to the chiller unit to encase the chiller outlet port and a second end connected to the freezer unit to encase the freezer inlet port thereby linking in fluid communication the freezer chamber and the chiller cavity;

(g) a first gate valve located proximate the freezer outlet port capable of maintaining an open position to allow fluid flow through the first conduit and maintaining a closed position to prevent fluid flow through the first conduit;

(h) a second gate wave located proximate the freezer inlet port capable of maintaining an open position to allow fluid flow through the second conduit and maintaining a closed position to prevent fluid flow through the second conduit;

(i) means for opening or closing the first and second gate valves in synchrony upon receipt of a signal from the chiller unit thermostatic control;

(j) blower means proximate the first or second conduit for urging air to circulate from the freezer chamber to the chiller cavity through said conduit and from the chiller cavity to the freezer chamber through said conduit when the first and second gate valves are in their open positions; and (k) partition means in the chiller cavity for routing the circulating air around the cold water reservoir.

2. The system of claim 1 wherein the pressure in the system is regulated by a pressure control regulator connected to said conduit and the pump is activated by a signal from the pressure control regulator indicating a decrease in the desired pressure and the pump is inactivated by a signal from the pressure control regulator indicating an increase in the desired pressure; and wherein the ultraviolet unit is monitored by a photo-electric cell which can detect a failure in the ultraviolet unit and send a signal to inactivate the pump upon such failure.

3. The system of claim 1 wherein the first and second gate valves and the means for opening and closing same comprise a unitary sliding shunt mechanism.

4. A portable multiple service water purifier and dispensing system for purified water comprising a housing containing:

handle means for carrying the housing;

wheel means for rolling the housing;

means for receiving input water comprising a conduit connected to a source of input water or a reservoir mounted in the housing capable of receiving water from a bottle;

pump means connected to said conduit for moving the water throughout the system;

means for filtering solids from the water, disinfecting the water, and removing chemical contaminants from the water arranged in any order in series relationship and connected to said conduit;

said filtering means comprising an in-line, flow-through filtration cartridge capable of filtering out solid particulates greater than 5 microns in size from the water as the water is moved therethrough;

said disinfecting means comprising an in-line, flow-through ultraviolet light disinfection unit capable of disinfecting the water as the water is moved therethrough;

said chemical contaminant removing means comprising one or more in-line, flow-through chemical removal cartridges connected in series fashion capable of filtering out chemical contaminants from the water as the water is moved therethrough;

means for dispensing room temperature purified water connected to said conduit downstream of said serial arrangement of said filtering, disinfecting and chemical contaminant removing means comprising a first tap mounted on the housing which receives the purified water at room temperature;

means for heating the purified water and dispensing the heated purified water connected to said conduit downstream of said serial arrangement of said filtering, disinfecting and chemical contaminant removing means comprising a self contained, in-line thermostatically controlled heating unit capable of receiving the purified water, heating the purified water to a desired temperature, and delivering the heated purified water to a second tap mounted on the housing;

means for chilling the purified water and dispensing the chilled purified water connected to said conduit downstream of said serial arrangement of said filtering, disinfecting and chemical contaminant removing means comprising a chiller unit having a refrigeration system, a thermostatically controlled chilled cavity and a cold water reservoir housed within the chilled cavity for receiving and storing the purified water, the chiller unit being capable of delivering the chilled purified water to a third tap mounted on the housing; and means for making ice from the purified water and storing and dispensing the purified ice connected to said conduit downstream of said serial arrangement of said filtering, disinfecting and chemical contaminant removal means comprising a freezer unit having a refrigeration system, a thermostatically controlled freezer chamber, an automatic ice maker in the chamber capable of receiving the purified water, converting it to ice, and dispensing the ice into a storage bin located in the chamber, and a door mounted on the housing providing access to the chamber, wherein the chiller and freezer units further include interactive means for operatively sharing a single refrigeration system comprising:

(a) a freezer outlet port on the freezer unit accessing the freezer chamber from outside the freezer unit;

(b) a freezer inlet port on the freezer unit accessing the freezer chamber from outside the freezer unit;

(c) a chiller inlet port on the chiller unit accessing the chiller cavity from outside the chiller unit;

(d) a chiller outlet port on the chiller unit accessing the chiller cavity from outside the freezer unit;

(e) a first conduit having a first end connected to the freezer unit to encase the freezer outlet port, and a second end connected to the chiller unit to encase the chiller inlet port thereby linking in fluid communication the freezer chamber and the chiller cavity;

(f) a second conduit having a first end connected to the chiller unit to encase the chiller outlet port, and a second end connected to the freezer unit to encase the freezer inlet port thereby linking in fluid communication the freezer chamber and the chiller cavity;

(g) a first gate valve located proximate the freezer outlet port capable of maintaining an open position to allow fluid flow through the first conduit and maintaining a closed position to prevent fluid flow through the first conduit;

(h) a second gate valve located proximate the freezer inlet port capable of maintaining an open position to allow fluid flow through the second conduit and maintaining a closed position to prevent fluid flow through the second conduit;

(i) means for opening or closing the first and second gate valves in synchrony upon receipt of a signal from the chiller unit thermostatic control;

(j) blower means proximate the first or second conduit for urging air to circulate from the freezer chamber to the chiller cavity through said conduit and from the chiller cavity to the freezer chamber through said conduit when the first and second gate valves are in their open positions: and (k) partition means in the chiller cavity for routing the circulating air around the cold water reservoir, 5. The system of claim 4 wherein the pressure in the system is regulated by a pressure control regulator and the pump is activated by a signal from the pressure control regulator indicating a decrease in the desired pressure and the pump is inactivated by a signal from the pressure control regulator indicating an increase in the desired pressure; and wherein the ultraviolet unit is monitored by a photo-electric cell which can detect a failure in the ultraviolet unit and send a signal to inactivate the pump upon such failure.

6. The system of claim 4 wherein the first and second gate valves and the means for opening and closing same comprise a unitary sliding shunt mechanism.

7. A method for purifying water and dispensing the purified water room temperature, chilled, hot or ice from a portable system comprising the steps of:

receiving input water into a conduit in a housing;

moving the water through the conduit in the system;

filtering solids from the water by moving the water through an in-line, flow-through filtration cartridge connected in series fashion to said conduit capable of filtering out solid particulates greater than 5 microns in size from the water as the water is moved therethrough;

disinfecting the water by moving the water through an in-line, flow-through ultraviolet light disinfection unit connected in series fashion to said conduit capable of disinfecting the water as the water is moved therethrough;

removing chemical contaminants from the water by moving the water through one or more in-line, flow-through chemical removal cartridges connected in series fashion to said conduit downstream of said pump capable of filtering out chemical contaminants from the input water as the water is moved therethrough;

after completion of said filtering, disinfecting and chemical contaminant removing steps, moving the purified room temperature water to a first tap for receiving and dispensing the purified water at room temperature;

after completion of said filtering, disinfecting and chemical contaminant removing steps, moving the purified water to a heating unit capable of receiving the purified water, heating the purified water to a desired temperature, and delivering the heated purified water to a second tap for dispensing the heated purified water;

after completion of said filtering, disinfecting and chemical contaminant removing steps, moving the purified water into a chiller unit having a refrigeration system, a thermostatically controlled chilled cavity and a cold water reservoir housed within the chilled cavity for receiving and storing the purified water, chilling the purified water in the chiller unit and then delivering the chilled purified water to a third tap for dispensing chilled purified water;

after completion of said filtering, disinfecting and chemical contaminant removing steps, moving the purified water to a freezer unit having a refrigeration system, a thermostatically controlled freezer chamber, an automatic ice maker in the chamber capable of receiving the purified water, converting the purified water to ice, and finally dispensing the ice into an accessible storage bin located in the freezer; and regulating the temperature of the chilled cavity by linking the chilled cavity in fluid communication with the freezer chamber during the water chilling and ice making steps as necessary to maintain the desired temperature in the chilled cavity.

8. The method of claim 7 further including the steps of:

pressurizing the system by moving the water with a pump;

monitoring the pressure in the system with a pressure control regulator connected to said conduit;

activating the pump, by a signal from the pressure control regulator, when there exists a decrease in the desired system pressure;

inactivating the pump, by a signal from the pressure control regulator, when there exists an increase in the desired system pressure;

monitoring the ultraviolet unit with a photo-electric cell; and inactivating the pump, by a signal from the photo-electric cell, upon detection by the cell of a failure in the ultraviolet unit.

9. A multiple service water purifier and dispensing system for purified water comprising a housing containing:

a conduit connected to a source or input water or a reservoir mounted in the housing capable of receiving water from a bottle;

a pump connected to said conduit for moving the water;

an in-line, flow-through filtration cartridge; an in-line, flow-through disinfection unit; and one or more in-line, flow-through chemical removal cartridges; said filtration cartridge, chemical removal cartridges and disinfection unit being arranged, in any order, in series relationship with each other in said conduit to purify the water;

a first dispensing tap external to the housing for receiving and dispensing the purified water at room temperature connected in fluid communication with said conduit downstream of said series relationship of said filtration and chemical removal cartridges and disinfection unit;

a heating unit for receiving and heating the purified water connected in fluid communication with said conduit downstream of said series relationship of said filtration and chemical removal cartridges and disinfection unit;

a second dispensing tap external to the housing connected in fluid communication with said heating unit for receiving and dispensing heated purified water;

a chiller unit having a chilled cavity and a cold water reservoir housed within the chilled cavity for receiving, chilling and storing the chilled purified water, said chiller unit being connected in fluid communication with said conduit downstream of said series relationship of said filtration and chemical removal cartridges and disinfection unit;

a third dispensing tap external to the housing connected in fluid communication with said cold water reservoir;

a freezer unit having a freezer chamber, an automatic ice maker in the chamber capable of receiving the purified water, converting it to ice, and dispensing the ice, said freezer unit being connected in fluid communication with said conduit downstream of said series relationship of said filtration and chemical removal cartridges and disinfection unit, wherein said chilled cavity and said freezer chamber are linked in fluid communication to operatively share a single refrigeration system.

10. The system of claim 9 wherein the chiller and freezer units further comprise:

(a) a freezer outlet port on the freezer unit accessing the freezer chamber from outside the freezer unit;

(b) a freezer unit port on the freezer unit accessing the freezer chamber from outside the freezer unit;

(c) a chiller inlet port on the chiller unit accessing the chiller cavity from outside the chiller unit;

(d) a chiller outlet port on the chiller unit accessing the chiller cavity from outside the freezer unit;

(e) a first conduit having a first end connected to the freezer unit to encase the freezer outlet port, and a second end connected to the chiller unit to encase the chiller inlet port thereby linking in fluid communication the freezer chamber and the chiller cavity;

(f) a second conduit having a first end connected to the chiller unit to encase the chiller outlet port, and a second end connected to the freezer unit to encase the freezer inlet port thereby linking in fluid communication the freezer chamber and the chiller cavity;

(g) a first gate valve located proximate the freezer outlet port capable of maintaining an open position to allow fluid flow through the first conduit and maintaining a closed position to prevent fluid flow through the first conduit;

(h) a second gate valve located proximate the freezer inlet port capable of maintaining an open position to allow fluid flow through the second conduit and maintaining a closed position to prevent fluid flow through the second conduit;

(i) a means for opening or closing the first and second gate valves in synchrony upon receipt of a signal from the chiller unit thermostatic control;

(j) a blower means proximate the first or second conduit for urging air to circulate from the freezer chamber to the chiller cavity through said conduit and from the chiller cavity to the freezer chamber through said conduit when the first and second gate valves are in their open positions; and (k) a partition means in the chiller cavity for routing the circulating air around the cold water reservoir.

11. A water purifier and dispensing system for purified water comprising a housing containing:

a conduit connected to a source of input water or a reservoir mounted in the housing capable of receiving water from a bottle;

a pump connected to said conduit for moving the water;

a flow-through filtration cartridge connected to said conduit downstream of said pump;

a flow-through ultraviolet light disinfection unit connected to said conduit downstream of said filtration cartridge;

one or more flow-through chemical removal cartridges connected in series fashion to said conduit downstream of said disinfection unit;

a first dispensing tap external to the housing for receiving and dispensing the purified water at room temperature connected in fluid communication with said conduit downstream of said chemical removal cartridges;

a heating unit for receiving and heating the purified water connected in fluid communication with said conduit downstream of said chemical removal cartridges;

a second dispensing tap external to the housing connected in fluid communication with said heating unit for receiving and dispensing heated purified water;

a chiller unit having a chilled cavity and a cold water reservoir housed within the chilled cavity for receiving, chilling and storing the chilled purified water, said chiller unit being connected in fluid communication with said conduit downstream of said chemical removal cartridges;

a third dispensing tap external to the housing connected in fluid communication with said cold water reservoir; and a freezer unit having a freezer chamber capable of receiving the purified water, converting it to ice, and dispensing the ice, said freezer unit being connected in fluid communication with said conduit downstream of said chemical removal cartridges, wherein the chiller and freezer units further comprise:

(a) a freezer outlet port on the freezer unit accessing the freezer chamber from outside the freezer unit;

(b) a freezer inlet port on the freezer unit accessing the freezer chamber from outside the freezer unit;

(c) a chiller inlet port oil the chiller unit accessing the chiller cavity from outside the chiller unit;

(d) a chiller outlet port on the chiller unit accessing the chiller cavity from outside the freezer unit;

(e) a first conduit having a first end connected to the freezer unit to encase the freezer outlet port, and a second end connected to the chiller unit to encase the chiller inlet port thereby linking in fluid communication the freezer chamber and the chiller cavity;

(f) second conduit having a first end connected to the chiller unit to encase the chiller outlet port, and a second end connected to the freezer unit to encase the freezer inlet port thereby linking in fluid communication the freezer chamber and the chiller cavity;

(g) a first gate valve located proximate the freezer outlet port capable of maintaining an open position to allow fluid flow through the first conduit and maintaining a closed position to prevent fluid flow through the first conduit;

(h) a second gate valve located proximate the freezer inlet port capable of maintaining an open position to allow fluid flow through the second conduit and maintaining a closed position to prevent fluid flow through the second conduit;

(i) a means for opening or closing the first and second gate valves in synchrony upon receipt of a signal from the chiller unit thermostatic control;

(j) a blower means proximate the first or second conduit for urging air to circulate from the freezer chamber to the chiller cavity through said conduit and from the chiller cavity to the freezer chamber through said conduit when the first and second gate valves are in their open positions; and (k) a partition means in the chiller cavity for routing the circulating air around the cold water reservoir.

12. A multiple service water purifier and dispensing system for purified water comprising a housing containing:

conduit means for receiving input water;

means for moving the water through said conduit;

means for filtering solids from the water, disinfecting the water, and removing chemical contaminants from the water connected in any order in series arrangement relationship to said conduit to purify the water;

means for dispensing the purified water at room temperature connected to said conduit downstream of said serial arrangement of said filtering, disinfecting and chemical contaminant removing means;

means for heating the purified water and dispensing the heated purified water connected to said conduit downstream of said serial arrangement of said filtering, disinfecting and chemical removing means;

chiller unit means for chilling the purified water and dispensing the chilled purified water connected to said conduit downstream of said serial arrangement of said filtering, disinfecting and chemical contaminant removing means; and freezer unit means for making ice from the purified water and storing and dispensing the purified ice connected to said conduit downstream of said serial arrangement of said filtering, disinfecting and chemical contaminant removing means, wherein the chiller and freezer unit means operatively share a single refrigeration system.

13. A method for purifying water and dispensing the purified water room temperature, chilled, hot or ice from a portable system comprising the steps of:

providing a housing;

receiving input water by connecting a conduit located in the housing to a source of input water or a reservoir mounted in the housing capable of receiving input water from a bottle;

moving the water through the conduit;

filtering particulates from the water in said conduit as the water is moved therethrough;

disinfecting the water in said conduit as the water is moved therethrough;

removing chemical contaminants from the water as the water is moved therethrough;

after completion of said filtering, disinfecting and chemical contaminant removing steps, moving the purified room temperature water to a first tap for receiving and dispensing the purified water at room temperature;

after completion of said filtering, disinfecting and chemical contaminant removing steps, moving the purified water to a heating unit capable of receiving the purified water, heating the purified water to a desired temperature, and delivering the heated purified water to a second tap for dispensing the heated purified water;

after completion of said filtering, disinfecting and chemical contaminant removing steps, moving the purified water into a chiller unit for receiving and storing the purified water, chilling the purified water in the chiller unit and then delivering the chilled purified water to a third tap for dispensing chilled purified water;

after completion of said filtering, disinfecting and chemical contaminant removing steps, moving the purified water to a freezer unit having an ice maker therein for receiving the purified water, converting the purified water to ice, and finally dispensing the ice into an accessible storage bin located in said freezer unit; and linking the chiller unit in fluid communication with the freezer unit to maintain the desired temperature in the chiller unit.

* * * * *